(12) United States Patent
Mannheim Astete et al.

(10) Patent No.: US 8,088,472 B2
(45) Date of Patent: Jan. 3, 2012

(54) ARMORED GLASS COMPOSITION WITH PERIMETER REINFORCEMENT

(75) Inventors: Arturo Mannheim Astete, Bogota (CO); Vladimir Bocanegra Parra, Bogata (CO)

(73) Assignee: AGP América S.A., Panamá (PA)

( * ) Notice: Subject to any disclaimer, the term of this patent is extended or adjusted under 35 U.S.C. 154(b) by 1134 days.

(21) Appl. No.: 11/663,949

(22) PCT Filed: Sep. 28, 2005

(86) PCT No.: PCT/IB2005/003094
§ 371 (c)(1), (2), (4) Date: Jun. 28, 2007

(87) PCT Pub. No.: WO2006/035312
PCT Pub. Date: Apr. 6, 2006

(65) Prior Publication Data
US 2008/0032104 A1    Feb. 7, 2008

(30) Foreign Application Priority Data
Sep. 28, 2004  (CO) .................................. 04096136

(51) Int. Cl.
*B32B 7/02* (2006.01)
(52) U.S. Cl. ......... 428/212; 428/215; 428/426; 428/433
(58) Field of Classification Search .................. 428/212, 428/215, 426, 433
See application file for complete search history.

(56) References Cited

U.S. PATENT DOCUMENTS

| 5,637,363 | A | 6/1997 | Leray et al. ..................... 428/34 |
| 6,129,974 | A | 10/2000 | Wöll |
| 6,280,826 | B1 | 8/2001 | Wöll |
| 6,334,382 | B2 | 1/2002 | Gourio |
| 6,569,787 | B1 | 5/2003 | Snelling ......................... 442/135 |
| 6,708,595 | B1 | 3/2004 | Chaussade et al. ............... 89/36 |
| 7,584,689 | B2 * | 9/2009 | Jones et al. .................. 89/36.02 |

FOREIGN PATENT DOCUMENTS

| DE | 198 03 435 | 8/1999 |
| DE | 199 18 526 | 10/2000 |
| DE | 100 02 671 | 8/2001 |
| DE | 100 43 793 | 3/2002 |
| DE | 10043793 A1 | 3/2002 |
| DE | 100 48 566 | 4/2002 |
| DE | 10048566 A1 | 4/2002 |

* cited by examiner

*Primary Examiner* — David Sample
*Assistant Examiner* — Lawrence Ferguson
(74) *Attorney, Agent, or Firm* — Jacobson Holman PLLC

(57) ABSTRACT

The invention relates to a special array of materials located on the periphery of a glass armored composition (BRG), with the purpose of having a controlled deformation zone being able to absorb residual energy of impacts made on the edge of the armored piece, therefore providing an effective retention of the projectile and of the glass fragments generated by the impact. The invention provides superior ballistic protection for BRGs destined for automobile applications, for fixed and mobile pieces.

28 Claims, 14 Drawing Sheets

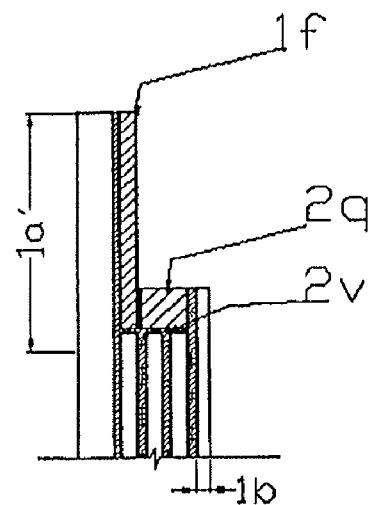
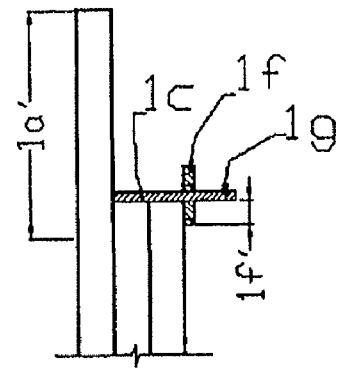
FIG. 3I  FIG. 3J
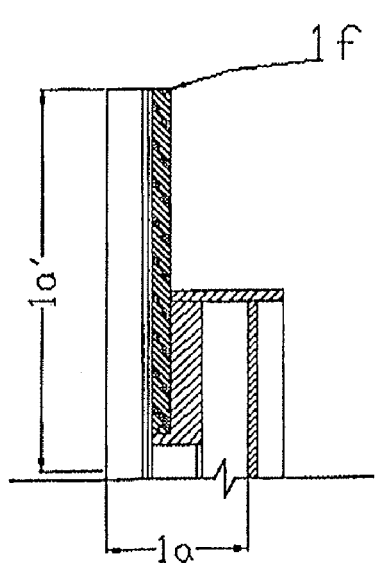
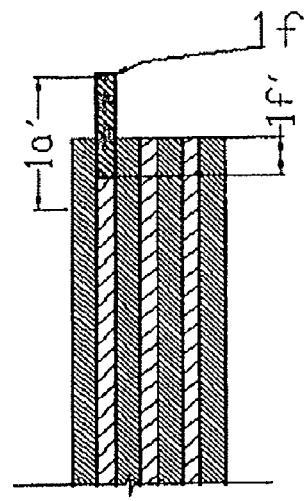
FIG. 3K  FIG. 3L

Design i

Design ii

Design iii

Design iv

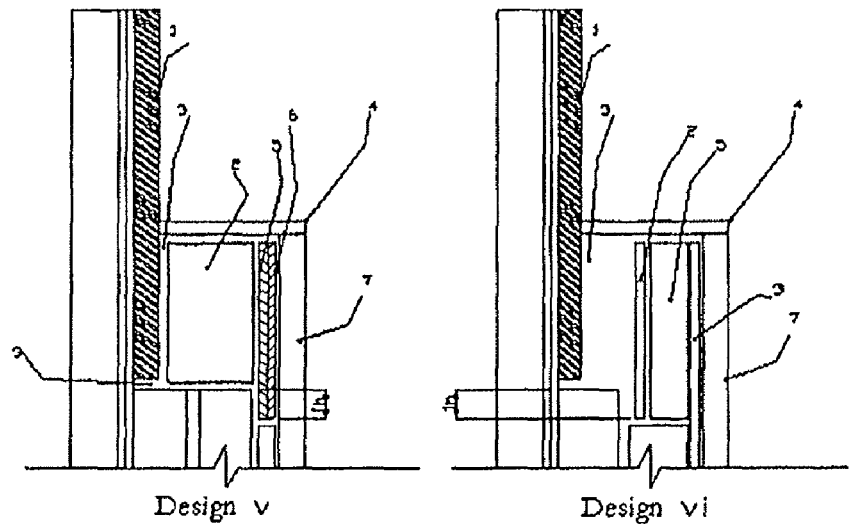
FIG. 8E  Design v    FIG. 8F  Design vi
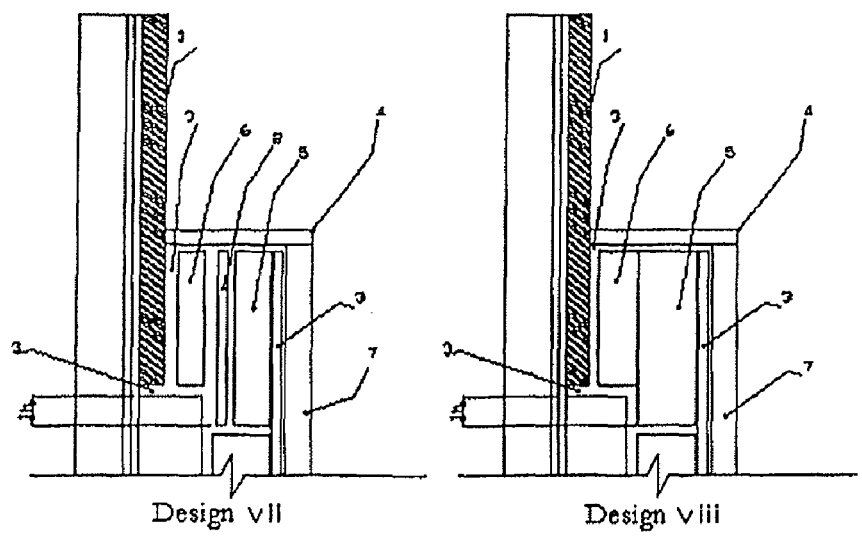
FIG. 8G  Design vii   FIG. 8H  Design viii

ARMORED GLASS COMPOSITION WITH PERIMETER REINFORCEMENT

This is a national stage of PCT/IB2005/003094 filed 28 Sep. 2005 and published in English.

FIELD OF THE INVENTION

The invention is related to bullet-proof glass armored compositions (BRG), for automobile and architectural applications. These compositions conventionally consist of a set of glass layers joined together by polymer layers (in most cases, Polyvinyl Butyral (PVB) and Polyurethane (PU)) and a layer of Polycarbonate. Among currently used transparent armored compositions for glass automobile applications, three primary parts can be distinguished, which will be described making reference to FIG. 1. First, in reference to cross section 1-1 and starting from the outside in ("exterior" or "outside" meaning space from which a bullet is normally shot from, and "external" as a layer face of a BRG set located furthest from the set's center; likewise, "interior" refers to the closed space protected by the BRG, and "internal" as a layer face of a BRG set located nearest the center of said set), we find a first set $1a$ comprising the glass layers 30 having the same or different thickness joined together by layers of one or several different types of adherent polymers 31. Second, we find a second set $1b$ made up of an impact energy absorbent element (IEA) 32 (typically polycarbonate) and the polyurethane layers 33 required to fix the IEA 32 to the first set $1a$. In some instances, depending on the BRG product's application, the second set $1b$ may have on its external face (facing the protected interior space), a PET layer (polyethylene terephthalate) 34 bonded to the IEA 32 by a polyurethane layer 33. In other occasions, said PET and polyurethane layer set is replaced by a hard coating incorporated within the external face of the IEA (facing outwards). Third, we find a third set $1c$ which provides a seal for the edge of sets $1a$ and $1b$. One special feature of this type of BRG composition is the extension $1c'$ of the first set's $1a$ most external glass 30'. This extension $1c'$ forms a perimeter around the BRG which allows its easy and effective installation inside a car's body, operatively fitting with slot 50 in FIGS. 2A-B.

In most cases, the first set $1a$ is comprised of several glass layers (Soda-Lime or Silica or Aluminumsilicate or Borosilicate) or other ceramic or ceramic-glass material having the same or different thickness. In practical terms, the thickness of these layers ranges between 0.4 mm and 15 mm; in most cases, adherent elements of the first set $1a$ are Polyvinyl Butyral or Thermoplastic Polyurethane (TPU) films. Other polymers that may be used are EVA (ethylene-vinyl acetate), polyester, polyethylene, Surlyn® (DuPont's Sentry Glass Plus), acrylic resins and any other ionomer modification of said polymers. In most cases, the second set $1b$ comprises a polycarbonate layer. This polycarbonate may have a hardening treatment on one of its surfaces. In most cases, this coating is a polyxilosane type coating. Another element that can make part of the second set $1b$ is a PET layer with a hard coating on one of its surfaces. The adhesives used in the second set $1b$ are Thermoplastic Polyurethane (TPU) films. Other polymers that may be used are EVA (ethylene-vinyl acetate), polyester, polyethylene, Surlyn® (DuPont's Sentry Glass Plus) and any other ionomer modification of said polymers. The third set $1c$ comprises one or a combination of various adhesives. In most cases the adhesive used is Thermoplastic Polyurethane but other adhesives mentioned above may be used, as well as commercial sealants, such as silicones for mounting glass.

Once again making reference to FIG. 1, the zone of the armored glass comprised of part $1c'$ is a weak zone both mechanically as well as ballistically, due mainly to the following aspects:

1) Said zone is coated with glazeable ceramic paint or enamel lip applied on the glass and subject to heat treatment in order to achieve chemical bond between the glass and the paint. This paint lip is applied for aesthetic reasons, among other reasons, to hide the edges of sets $1a$ and $1b$. This paint is comprised of ceramic and metallic oxide particles and possesses a heat expansion coefficient different to that of glass. This causes, upon exposing the glass-paint set to high temperature (between 150° and 550° C.), that differences in glass and paint heat expansion coefficients induce differences in glass and paint dilation, leading to the generation of internal stresses within the interface of the painted area and the glass. These internal stresses generate a reduction of the mechanical resistance of the glass in the painted zone. Hence, it may be found that ultimate resistance or modulus of rupture of a Soda-Lime glass painted with glazeable ceramic enamel or paint, in the painted area, may range between 40% and 80% of the modulus of rupture of the glass' non-painted area, measured in a glass flexural strength assay.

2) The area comprised by $1c'$ is supported on the car's body (for example see slot 50 of FIGS. 2A-B), which permits the armored glass' installation and allows it to slide on the metallic structure (in the case of mobile glass). There are several options for mounting armored glass on a car. FIGS. 2A-B shows the most common, wherein $1c'$ is not totally reinforced with a ballistic material (either being part or not of the car's body), specifically where $1c''$ is left unprotected. In order for part $1c''$ not to become a ballistic hole, a reinforcement $1f$ made of ballistic material, generally steel (see FIG. 2B), may be placed. FIGS. 3A-L shows other known variations within the art for this reinforcement.

Further, and going back to FIG. 1, the area comprised by part $1c'$ is ballistically weak (since the pathway of a projectile $1m$ only encounters resistance given by one part of the BRG composition) and mechanically (since it holds lesser resistance compared to other zones of the external glass 30' due to the glass-paint set's weakness and to the diminished thickness of the glass layer 30' vis-à-vis the total thickness of the BRG).

In addition, and making reference to FIG. 1, it is widely known that BRG have a ballisitically weak zone not only over $1c'$, but likewise over area $1x$. So much so that known ballistic standards, such as the European Committee for Standardization (CEN-EN1063—www.cenorm.be/cenrom/index.htm), Underwriters Laboratory (UL-752 www.ul.com/info/standard.htm), and the National Institute of Justice (NIJ-0108.01 www.ojp.usdoi.gov/nij/welcome.html), consider not valid an impact received within 60 mm measured from the edge of the armored glass (CEN EN 1063) and within 50 mm measured from the edge of the armored glass (NIJ-0108.01). The foregoing illustrates that no public industry norm exists which regulates the resistance of a glass armored composition against a ballistic impact close to its edge. UL-752 is the norm which provides the closest approximates; it evaluates the retention of a projectile for some armored glass, created by an impact at a distance between 25 and 38 mm measured from one of the edges of the test body, but even then considers the generation and passage of glass splinters towards the protected space as acceptable.

Continuing with FIG. 1, we then have that area $1a'$ (the sum of the two weak areas $1c'$ and $1x$) around all the perimeter of the armored glass piece presents a ballistically weak zone. The two ways to solve this problem are:

1) Extending reinforcement $1f$ of FIG. 2B a distance $1f''$ towards the interior of first set $1a$; or,
2) Completely embedding the edge $1c'$ within a reinforcement made of a ballistic material; this reinforcement may belong to the car's body (or structure forming part of the protected space) or may be an element which is external to the structure, but that ultimately will form a set together with the armored glass and body (or structure forming part of the protected space) starting from adhesive elements or mechanical couplings.

The prior art contains several options to solve ballistic and mechanical resistance problems in the armored glass zones determined by areas $1c'$ and $1x$.

DE19803435 relates to an armored glass composition reinforced with a metallic reinforcement comprised of two parts $1f$, one of them forming part of the armored glass body and the other forming part of the car body or metallic structure. These reinforcements can be made out of ballistic material, either steel, ceramic or other type of ballistic material (FIG. 3E).

WO0053410 discloses a reinforcement for the armored glass composition. This reinforcement can be made out of any ballistic material (metallic or fiber reinforced). This reinforcement may have several geometrical shapes, including L, T or a combination of these shapes (FIG. 3a).

U.S. Pat. No. 6,129,974 illustrates a BRG with an L-shaped metallic reinforcement $1f$ (preferably steel) on its edge, fixed to the BRG with polyurethane and likewise coated with polyurethane (FIG. 3F).

DE19918526 proposes armored glass with a metallic insert $1f$, which is embedded within the space created by one of the glass layers belonging to the first set $1a$ of the BRG. The metallic insert this way covers the zones comprised by $1c'$ and $1a'$, and is fixed to set $1a$ by an adhesive $2u$ (FIG. 3G).

WO0100403 puts forward a solution of using one or several reinforcements $1f$ introduced within the BRG composition. This reinforcement can be made of any ballistic material (FIG. 3H). In one of the patent's embodiments (FIG. 3I), the possibility is also contemplated using a reinforcement block of compound material $2q$ made of material consisting of polymers-fibers and bonded to set $1b$ and reinforcement $1f$ of the BRG by a Polyvinyl Butyral adhesive $2v$. However the architecture, form of adherence, nor size of this compound block is specified in order to comply with a complete ballistic protection over area $1a'$.

DE10002671 establishes a solution given by the use of a reinforcement consisting of several pieces $1f$, $1g$ (FIG. 3J), that may be metallic, ceramic or other type of ballistic material. These pieces are in contact within area $1a'$. Set $1c$ and may extend over other areas of the BRG. The metallic reinforcements are bonded or adhered together and one of the reinforcement pieces overlaps the car's body.

U.S. Pat. No. 6,280,826 discloses the use of a metallic reinforcement $1f$ used as an insert in the first set $1a$ (see FIG. 3K). This insert is embedded in one of the glass layers of the first set $1a$. The glass layer where the reinforcement is inserted is of lesser thickness than the reinforcement and forms a step with the adjacent glass layer, which is bigger in size. All of the spaces created between the reinforcement and the adjacent glass layers are filled with polyurethane adhesive (TPU).

U.S. Pat. No. 6,334,382 sets forth an armored glass configuration wherein the reinforcement is a protuberance $1f$ (FIG. 3L) that extends beyond the edge of at least one of the other glass layers that makes up the armored composition. Said metallic protuberance is the extension of one of the Polyvinyl Butyral adherent layers, having the same thickness as the adherent layer.

The solutions posed by the prior art demonstrate glass armored compositions for automobile applications, wherein the composition is reinforced over weak zone $1a'$ with elements made of ballistic material that may be integral with the armored composition, or make part of the structure of the protected space.

The solutions posed by the prior art that include some reinforcement element incorporated in the armored glass composition, do not provide a complete solution to the ballistic weakness problem of zone $1a'$. The options provided incorporate highly rigid designs on the armored glass edge which upon strict ballistic testing, do not offer total protection of the protected space. Ballistic protection not only can be measured from a projectile retention perspective, but also from glass or projectile residue or particle retention which are generated from edges of any armored glass composition when the piece is subject to ballistic testing in the zone determined as $1a'$, and which can be as aggressive for humans as the projectile itself.

Ballistic testing shown in FIG. 4 is a real ballistic condition that an armored piece can be subject to when under gunfire. Ballistic testing may be characterized by three attack zones with respect to the interior (inferior) edge of reinforcement $1f$ that the armored composition incorporates. Zone $3a$ is located slightly above internal edge of $1f$, zone $3b$ on top of the internal edge of $1f$ and zone $3c$ slightly below the internal edge of $1f$. The ballistic testing referred to, on a typical piece such as a side car window, consists of at least three impacts which may be distributed over zones $3a$, $3b$ or $3c$, the distance between two consecutive impacts being the same or greater than 120 mm. Before ballistic testing such as the one described above, the prior art does not efficiently provide an armored glass composition that provides complete ballistic retention protection, either of impacts or splinters (or glass or projectile residue) over area $1a$. In other words, making reference to FIG. 4, prior art does not assure that a BRG composition that complies with a set ballistic resistance in its central area in accordance to some recognized ballistic standard, will comply with the same ballistic protection over area $1a'$ when this area is hit with the same ammunition as the central area.

By subjecting some representative designs that exist in the prior art, such as those identified in FIGS. 3B, 3D, 3I and 3K, to ballistic testing over area $1a'$, based on the CEN-EN1063 BR4 standard, and whose design test piece and impact are graphically described in FIG. 6, such armored constructions with said designs being produced in commercially acceptable configurations regarding BRG thicknesses and width of areas covered with glazed paint (non-transparent area of BRG)—some failure modes shown in FIG. 5 appeared. Failure mode 1 is the generation of splinters or projectile traces through the BRG area which makes contact with reinforcement $1f$, and through the glass layers' borders which make up the BRG, causing the rupture of the third set $1c$ of the BRG and in some cases total detachment thereof against reinforcement $1f$. Failure mode 2 is the generation of splinters or passage of projectile traces through the BRG space created by the separation of the second set $1b$ from the first set $1a$ and adhesives in between. This failure also produces rupture of the BRG's third set $1c$. Failure mode 3 is the total or partial perforation of the BRG, creating damage in the second set $1b$ and allowing projectile passage and/or splinters inside the space protected by the BRG. This failure does not necessarily generate rupture of the third set 1c.

When the term "exterior" is used, reference is being made to the space from where a bullet is normally shot from.

When the term "interior" is used, reference is made to the space defined by the enclosure protected by the BRG.

When the term "external" or "outside" is used, reference is made to the side or edge of a layer of a BRG set located furthest from the center of said set.

When the term "internal" or "inside" is used, reference is made to the side or edge of a layer of a BRG set located nearest the center of said set, or simply the side or edge opposite the external side or edge of said layer.

When the term "side" is used, reference is being made to the layer surface of a BRG set found essentially parallel to the BRG main plane, the BRG main plain meaning the vertical plane defined by two parallel lines running along side one of the glass layers 30 in FIG. 1.

When the term "edge" is used, reference is made to the surface of a BRG layer or set found essentially perpendicular to the BRG main plane.

SUMMARY OF THE INVENTION

The present invention provides an effective ballistic solution against attacks over the 1a' zone found in FIG. 1. This solution is given by incorporating special positioning of different materials on the periphery of the armored composition, with the purpose of obtaining controlled deformation and energy absorption over the armored glass edge thereby offering an effective ballistic protection even under attacks on the edge of the armored composition, avoiding passage of the projectile and glass and projectile splinters towards the protected space, without the need of adding protection by using elements external to the BRG.

DESCRIPTION OF FIGURES

FIG. 2B depicts an example without perimeter reinforcement, FIG. 2B shows an example with perimeter reinforcement 1f.

FIGS. 3A-L: Demonstrates cross sections of particular BRG examples found in the art of deigns which intend to provide solutions for ballistic weakness over the 1a' zone.

FIGS. 8A-L: Shows several cross sections of designs tested in order to optimize the present invention.

DETAILED DESCRIPTION OF THE INVENTION

Figure 1:
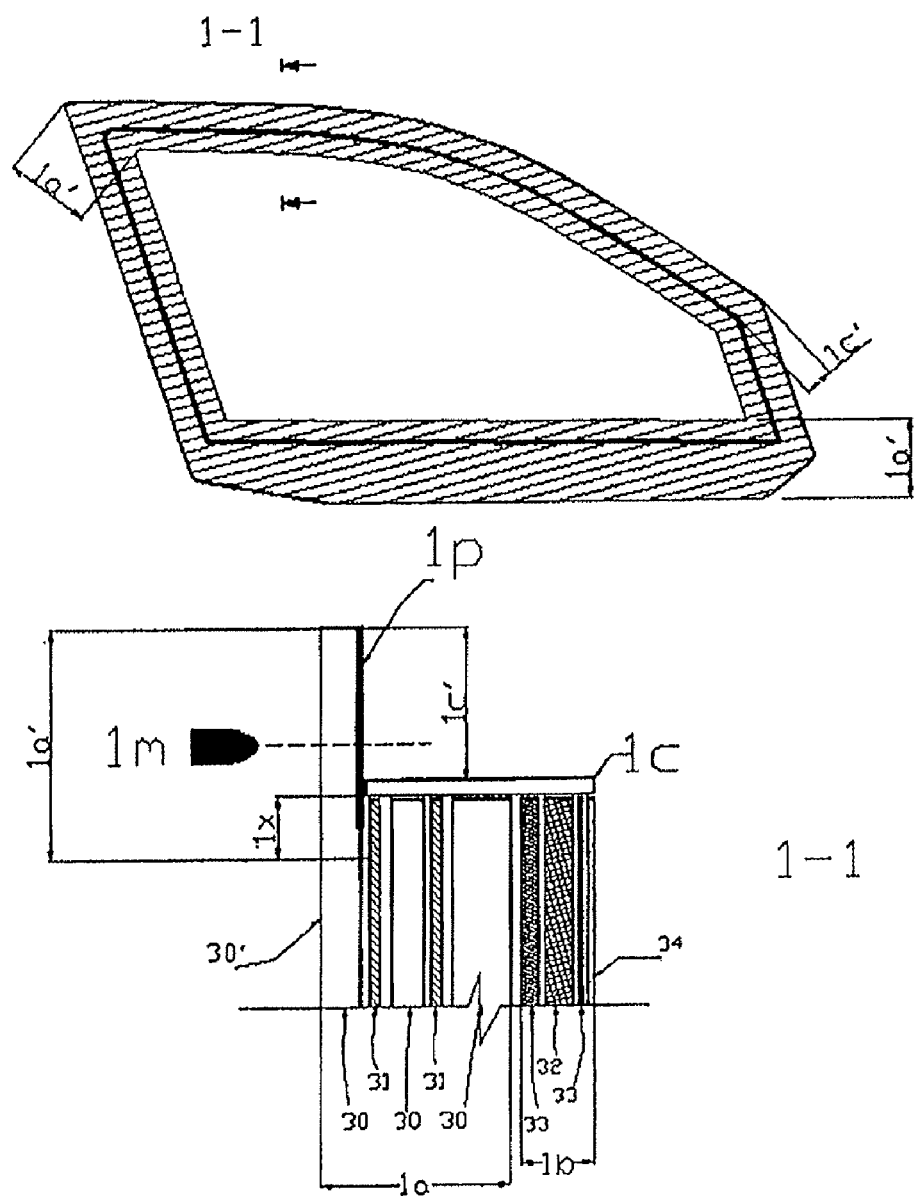
FIG. 1: Shows a frontal view and cross section 1-1 of an example of the design of a BRG found in the state of the art.
Figure 2A:
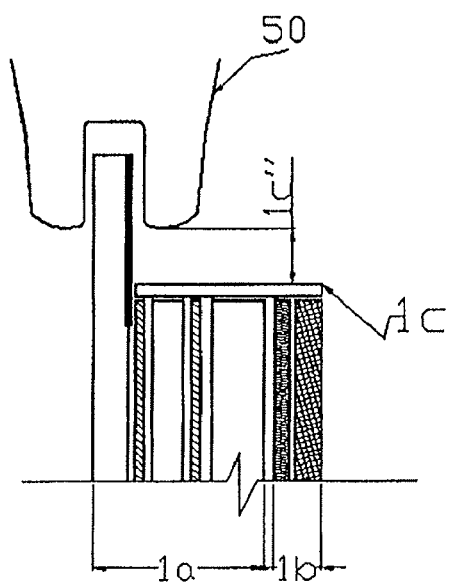
FIGS. 2A-B: Illustrates cross sections of examples of BRG designs found in the art.
Figure 2B:
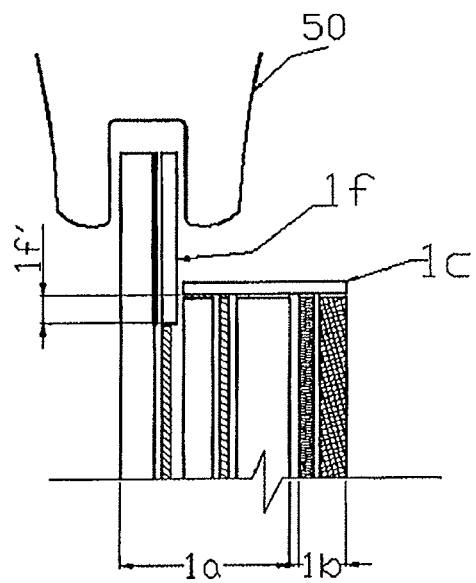

Within an armored glass composition, each one of the differentiated sets in FIG. 1 has a specific function from a ballistic perspective. The first set 1a, comprised of a series of glass layers bonded together by the use of polymeric adhesives, works as a set which absorbs the greatest amount of projectile energy. This is the result of the increased hardness of the different glass layers 30 and the elastic capacities of the layered set which form these glass layers together with the polymer adhesives 31 which unite them. The second set 1b, primarily comprised by an impact energy absorber (IEA) element 32 which in most cases is a polycarbonate layer, and by the adhesives that are used to bond this IEA to the first set 1a, has the function of a highly elastic body which absorbs projectile residual energy which did not dissipate in the first set 1a. Hence, deformation (strain) of the second set 1b before projectile impacts may be several times greater compared to the first set 1a. Finally, the third set 1c, whose primary function within the BRG is to serve as an environmental barrier in order to diminish water vapor and some chemical substance migration towards the inside of the armored composition, also has a ballistic function which is to keep sets 1a and 1b together on impact, especially their edges over the glass periphery. However, prior art does not assure that protection given to the BRG edge by the third set 1c is sufficient to retain splinters (or glass and projectile traces) generated by a BRG composition when under attack over area 1a'.

Figure 7:
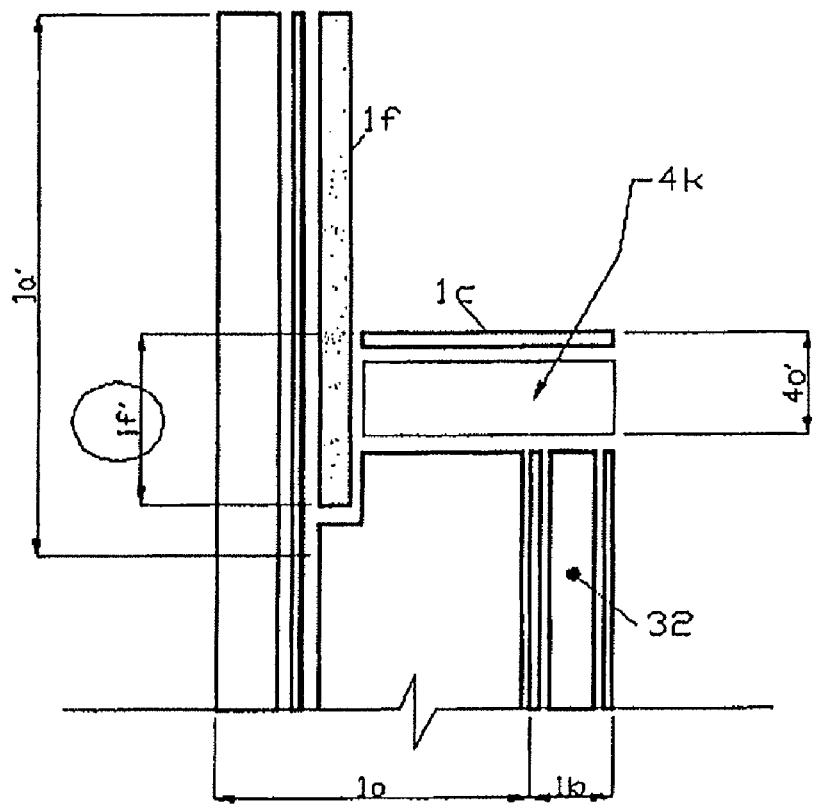
FIG. 7: Depicts a cross section of a BRG, disclosing the architecture of which the present invention is optimized.
Figure 8A:
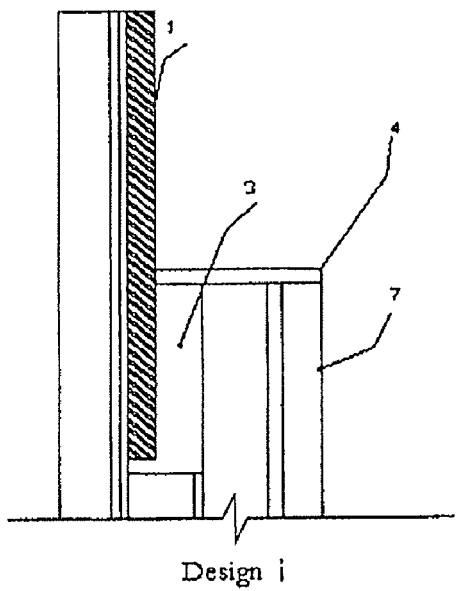
Figure 8B:
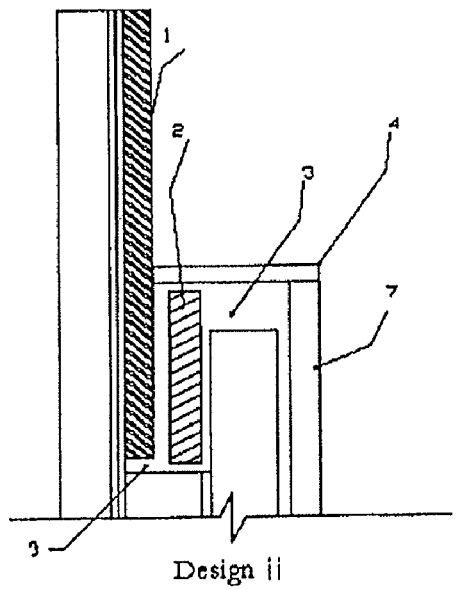
Figure 8C:
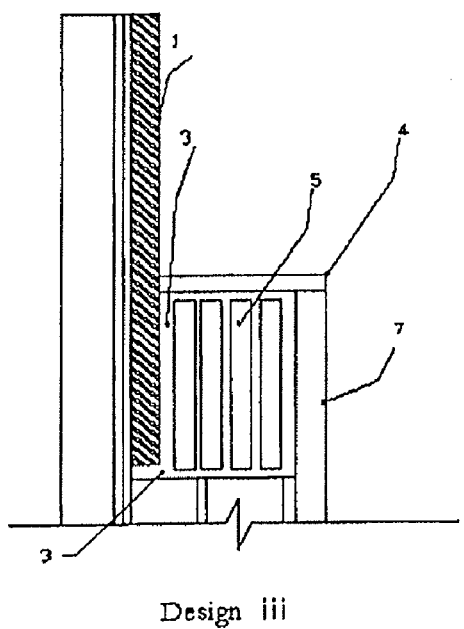
Figure 8D:
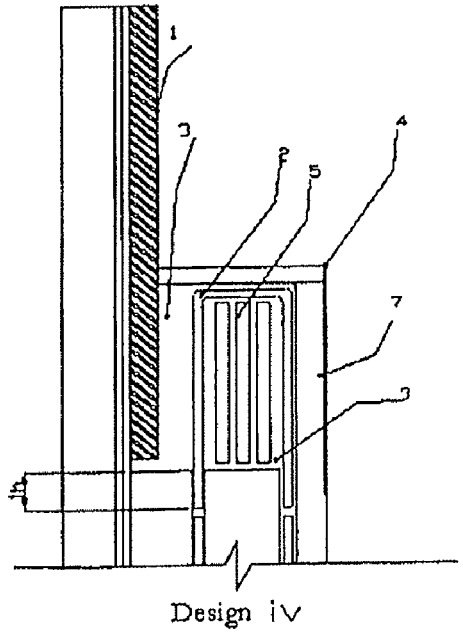
Figure 8I:
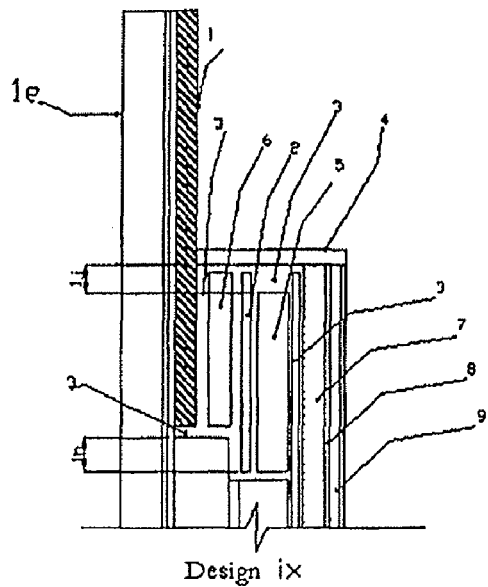
Figure 8J:
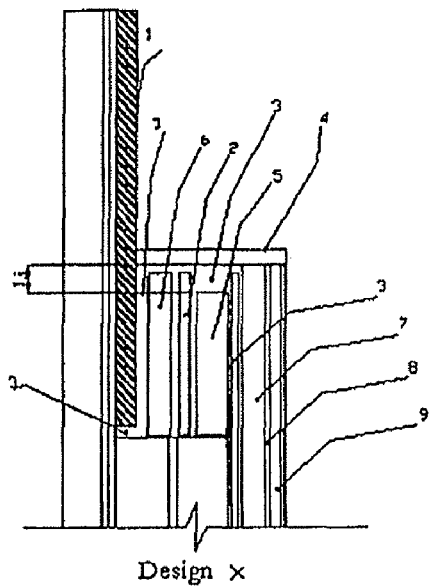
Figure 8K:
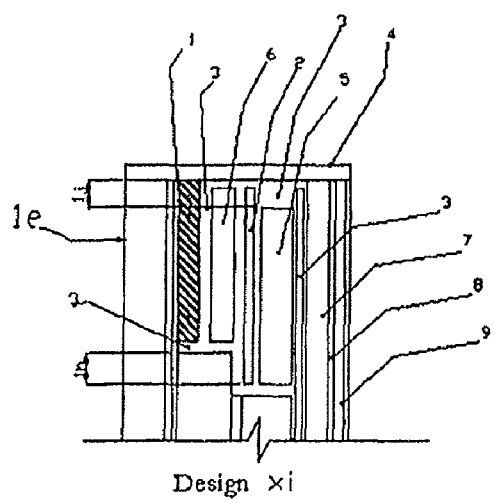
Figure 8L:
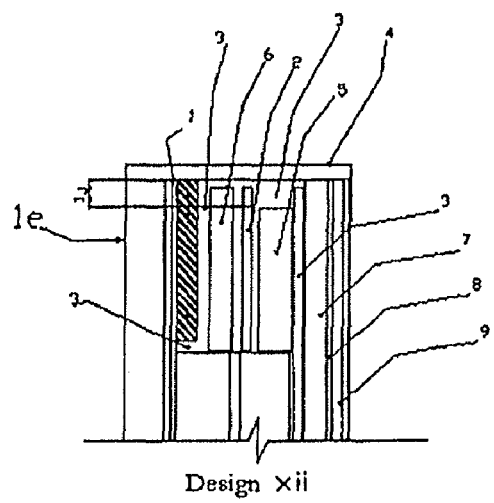

Making reference to FIG. 7, the present invention relates to a special array of polymeric materials as part of the third set 1c which under attack close to the edge of reinforcement 1f (within area 1a') undergoes controlled deformation retaining splinters or glass and projectile traces generated by the BRG, and at the same time allows for greater deformation of the second set 1b, in order to contain residual energy of the projectile. Therefore, different options were set forth so that each one could provide a determined array 4k of polymeric materials in such manner that under direct impact, the set could be elastically deformed but not to the limit of breaking. Therefore, the following conditions are required that will guarantee that the inventive set meets its ballistic function before impacts over the 1a' zone:

i) high elastic-plastic deformation (strain) of all of set 4k, containing energy of generated glass and projectile splinters, without breaking.

ii) high resistance to elongation, allowing materials in 4k not only to deform according to (i), but also to maintain integrity as a continuous body, without breaking, which if happens, glass and projectile splinters would pass through partially broken zones within the designed set body towards the protected space.

iii) optimized adherence of set 4k, not having such a high adherence that would cause total bonding to reinforcement 1f, thereby making the set rigid and therefore limiting glass and projectile splinter energy absorption, but also not so little adherence that would make the set loose total adherence with reinforcement 1f and to the rest of the BRG elements, and in such case the set would partially or totally detach allowing for glass and projectile splinters to pass towards the protected space.

iv) absorb energy of a direct impact in order to provide elastic-plastic strain capacity to the IEA 32. In prior art compositions, the IEA has the same size (or about the same size) of at least one of the glass layers attached thereto. When hit close to the BRG edge, this causes the IEA 32 not to deform in a plastic-elastic manner in the same magnitude as it would deform in an area far from the edge (BRG center) therefore increasing its hardness towards the edges. The design must then provide a greater elasticity to IEA towards the BRG edges.

Figure 3A:
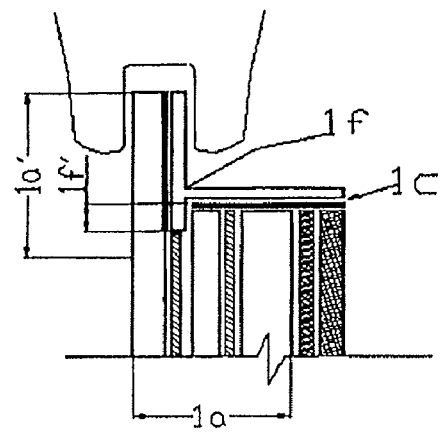
Figure 3B:
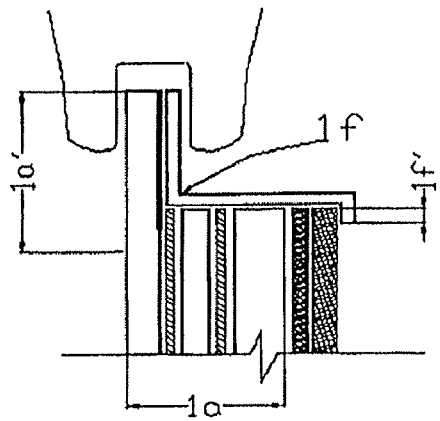
Figure 3C:
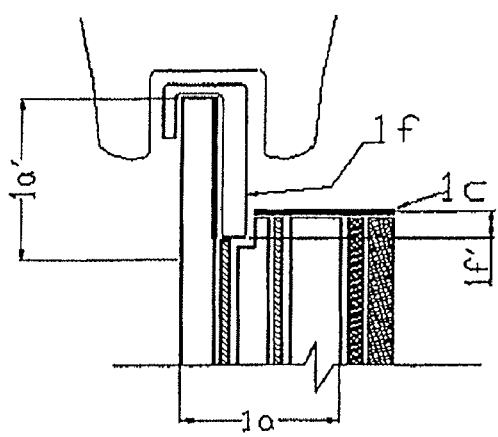
Figure 3D:
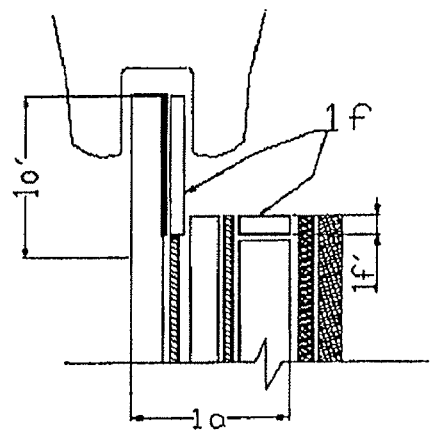
Figure 3E:
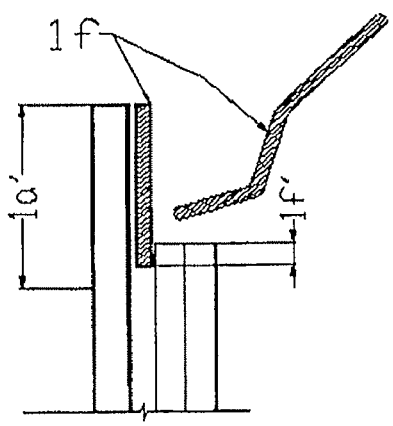
Figure 3F:
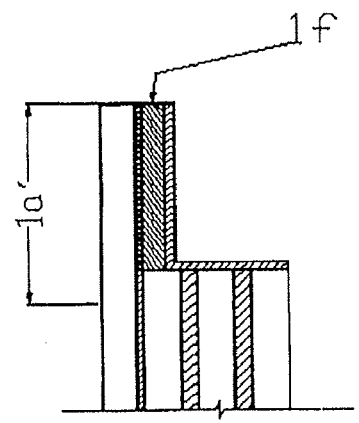
Figure 3G:
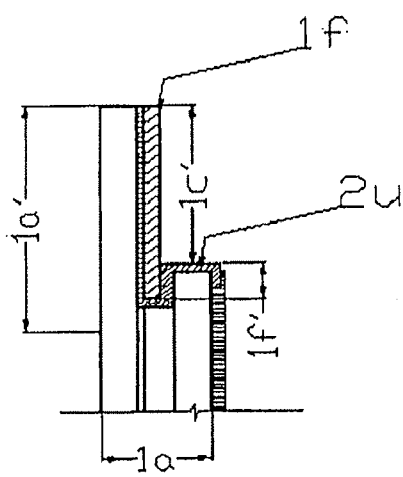
Figure 3H:
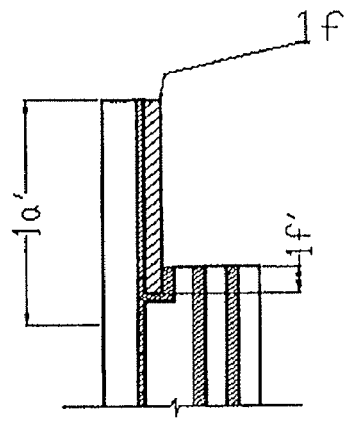
Figure 4:
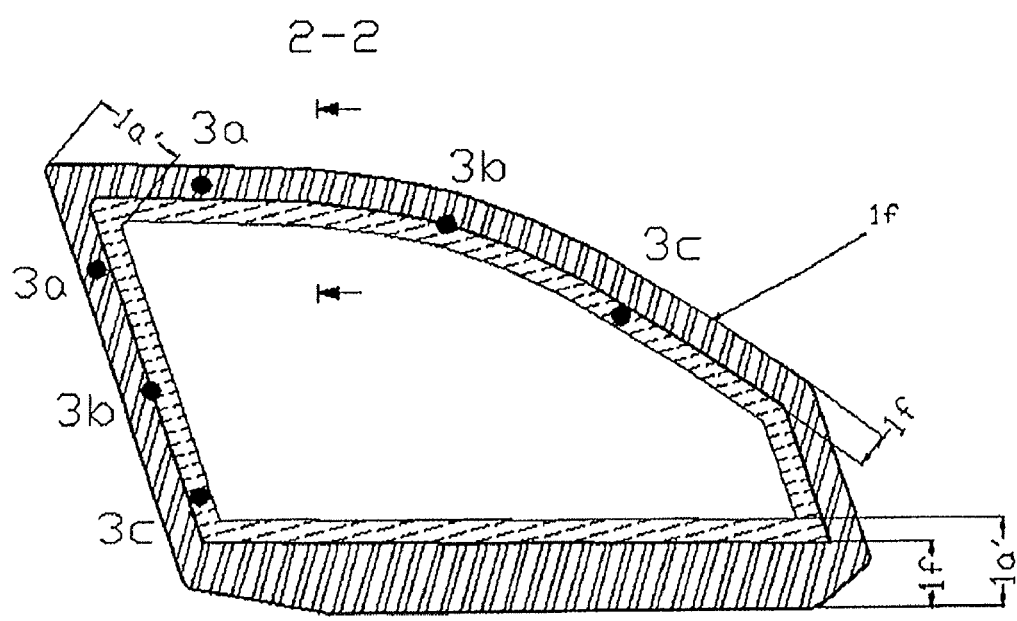
FIG. 4: Shows a frontal view of a BRG with ballistic weak zones 3a, 3b and 3c.
Figure 5:
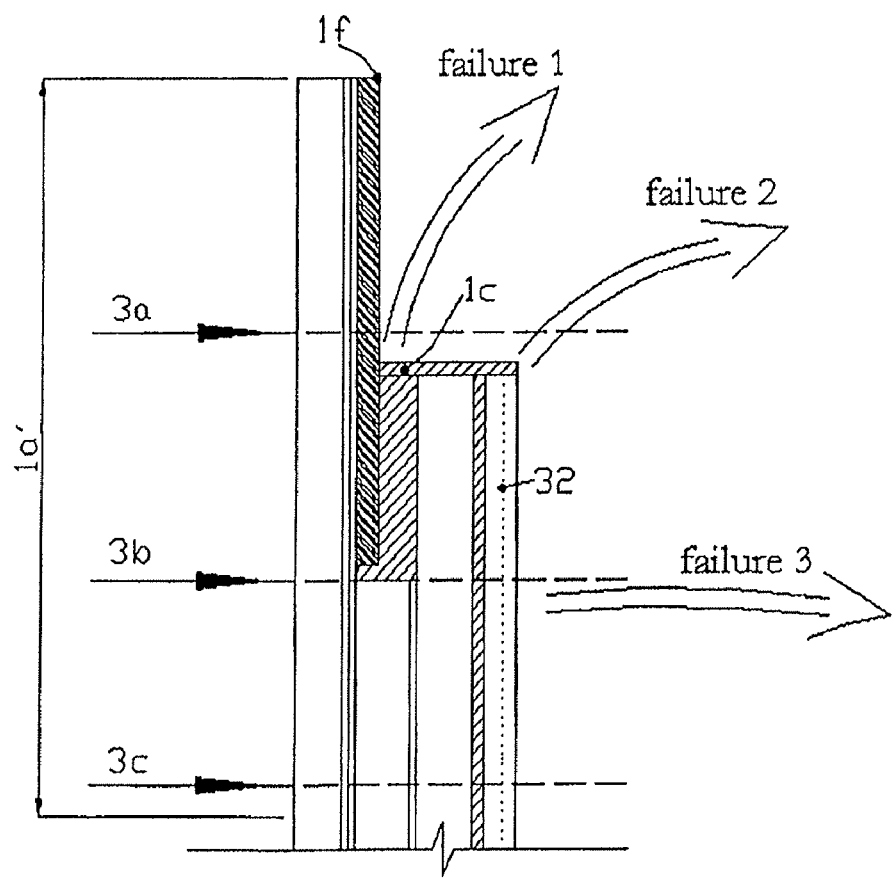
FIG. 5: Shows a cross section of a BRG highlighting the failure modes when impacted over the 1a' zone.
Figure 6:
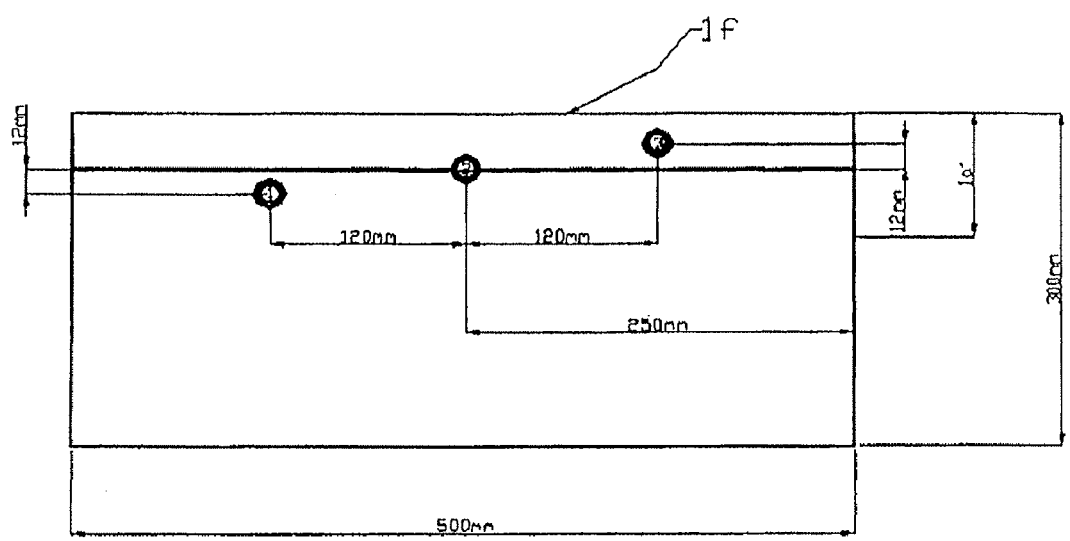
FIG. 6: Illustrates the test piece design for testing BRG integrity against projectile impacts over the 1a' zone.

In order to evaluate the different options provided, a ballistic test was carried out pursuant to what FIG. 6 depicts. FIGS. 8A-L contains 12 different designs that were tested using 500×300 mm test pieces. In essence, the following parameters were tested (see FIG. 7): steel reinforcement depth 1f" with respect to the top edge of set 1c; composition and geometry of the deformable body 4k, distance 4o' between the top edge of the sealant 1c and 4k's bottom edge. The test pieces were initially subject to a ballistic test pursuant to conditions given by the CEN-EN1063 norm (European Committee for Standardization), BR4 level, but with an impact array shown in FIG. 6, with three impacts per test piece. Three test pieces were produced of each of the different options and the aluminum sample located 50 cm behind the test piece was observed (pursuant to CEN-EN1063 requirements) after each impact in order to verify projectile and splinter passage through the BRG. Likewise, each option was analyzed under extreme ballistic testing. The test was carried out using 240 grain (15.55 g) weight Magnum 0.44 ammunition. Also included in the test was a representative design of the prior art (see FIG. 3I). FIGS. 8A-L shows different designs set forth in order to optimize the design in accordance to parameters already given, which will be described below:

Design i is a representative arrangement of the prior art.

Design ii incorporates a Kevlar layer inside the space formed by one of the glass layers which serves as an extension of the steel reinforcement (1) 2 mm thick and the next glass layer, the glass layer that serves as an extension of reinforcement (1), has a different size compared to at least one of the following BRG glass layers (towards the space protected by the BRG). The spaces formed between the reinforcement (1), the glass layers, the Polyvinyl Butyral adhesive, the Kevlar layer (2), polycarbonate which works as IEA (7) and the edge sealant's bottom edge (4) are filled with thermoplastic elastomer Polyurethane (3) (TPU). As the edge sealant (4), 1.2 mm thick TPU is also used.

Design iii is an arrangement wherein all glass layers which make up the BRG, except the first layer whereto the reinforcement (1) is attached, are all the same size among them and different than that of IEA (7). The space formed between the steel reinforcement surface (1), the glass layers' edges, polycarbonate surface used as IEA (7) and polyurethane's interior surface used as a sealant (4) is comprised of an arrangement of layers of unidirectional high density polyethylene fibers (5) with one TPU layer 0.62 mm thick in between, thereby forming a block made of material comprising fibers and polymer. The spaces formed between reinforcement (1), the glass layers, polyvinyl butyral adhesive layers, the block made of unidirectional high density polyethylene fibers (5) and the TPU and polycarbonate which acts as IEA (7), is filled with thermoplastic polyurethane (3) elastomer. As an edge sealant (4), TPU 1.2 mm thick is also used. Polycarbonate's thickness is 3.0 mm.

Design iv has a similar construction to iii but in addition a 0.6 mm thick insert made of several unidirectional high density polyethylene fibers (2) layered sheets is placed at a distance of 15 mm within the space created by the polyvinyl butyral and TPU layers at each side of the glass layer adhered to the polycarbonate; the space comprised between the insert (2) and the glass edge adhered to the polycarbonate is comprised of an arrangement of 1 mm thick polycarbonate layers adhered together with 0.62 mm thick TPU films. The spaces comprised between reinforcement (1), glass layers, polyvinyl butyral adhesive layers, reinforcement (2), polycarbonate acting as IEA (7) and the bottom edge of the edge sealant (4), is filled with thermoplastic polyurethane (3) elastomer (TPU). 1.2 mm thick TPU is also used as edge sealant (4).

Design v has a similar construction to iii but instead a block of unidirectional high density polyethylene fibers (2) is placed having a total thickness of 5 mm in the space formed between the steel reinforcement surface (1), the glass layers' edge, polycarbonate surface used as IEA (7) and polyurethane's interior surface used as a sealant (4), a 1 mm thick polycarbonate layer insert also exists (5) and a 0.6 mm thick high density unidirectional polyethylene fiber layer (6), which are inserted 15 mm inside (1h) the space created by the TPU layer which bonds the polycarbonate used as IEA (7); the space comprised between the insert (5), layer (2), glass layers, bottom edge of edge sealant (4) and reinforcement (1) is filled with thermoplastic polyurethane (3) elastomer (TPU); 1.2 mm thick TPU is also used as edge sealant (4).

Design vi consists of a composition similar to that described in v, but is different in that it has an insert comprised by a 4 mm thick unidirectional high density polyethylene fiber layer (5) inserted a distance of 15 mm (1h) reducing the glass layer size in contact with IEA (7). Therefore, this latter glass layer is shorter a distance (1h) compared to at least another glass layer which make up the BRG, the insert is also comprised of a 1 mm thick polycarbonate layer (2) next to the insert (5). The spaces comprised between reinforcement (1), the glass layers, polyvinyl butyral adhesive layers, insert (2), polycarbonate acting as IEA (7) and the bottom edge of the edge sealant (4), are filled with thermoplastic polyurethane (3) elastomer (TPU), the space comprised between the bottom edge of inserts (2) and (5) and the glass layer is also filled with TPU. As an edge sealant, 1.2 mm thick TPU is also used and TPU film is placed on IEA (7).

Design vii is similar to vi, but the space comprised between insert (2) and steel reinforcement (1) consists of an arrangement of high density unidirectional polyethylene fiber layers (6) having a total thickness of 1.8 mm. The spaces comprised between this arrangement (6), reinforcement (1), insert (2), glass layer edges and bottom surface of edge sealant (4) are filled with thermoplastic polyurethane (3) elastomer (TPU). The space comprised between the bottom edge of inserts (2) and (5) and the glass layer is also filled with TPU. As an edge sealant, 1.2 mm thick TPU is also used. Between insert (5) and IEA (7), a TPU film is placed.

Design viii is similar to vii but element (6) consists of an arrangement of high density unidirectional polyethylene fibers having a total thickness 3 mm. The thickness found in insert (5)—also high density unidirectional polyethylene fibers—is 4 mm. Insert (2) of figure vii is eliminated, so that inserts (6) and (5) are in contact. The additional aspects of the configuration are identical to those found in vi.

Design ix presents a configuration similar to that set forth in vii, but additionally, insert (5) is separated a distance (1j) of 5 mm from the bottom edge of he edge sealant (4). Additionally, the polycarbonate used as IEA (7) is divided in two layers whose total thickness is equivalent to the polycarbonate layer thickness used in vii. For this specific case, two polycarbonate layers were used, the first (internal layer) having a thickness of 2.0 mm adhered with a TPU film to the adjacent polycarbonate layer (the external layer) having a thickness of 1.0 mm. The space comprised between insert (5) and the bottom edge of edge sealant (4) is filled with TPU, of the same kind used for (4); the rest of the configuration is identical to that described for vii.

Design x has a similar configuration to ix, but distance (1h) of the insert is zero, i.e., the glass layers which make up the BRG, except the first glass layer, adhered to reinforcement (1) are the same size. The space comprised between the bottom edge of reinforcements (6), (2) and (5) and the glass layers is filled with TPU; the rest of the configuration is identical to that described for ix.

Design xi has a similar configuration to ix, but the first glass 30' of the BRG composition is not extended beyond the limit given by the edge sealant (4); the rest of the configuration is identical to that described for ix.

Design xii has a similar configuration to x, but the first glass 30' of the BRG composition is not extended beyond the limit given by the edge sealant (4); the rest of the configuration is identical to that described for x.

After ballistically testing designs i through xii pursuant to testing described in FIG. 6 and evaluating the mentioned failure modes, it is concluded that the best designs, those which pass the ballistic test described for area 1a' without showing marks on the aluminum sample, are v, vii, ix, x, xi and xii; being ix, x, xi, and xii the preferred embodiments, due to the ease of including these configurations in the production of curved automobile armored pieces.

A preferred embodiment of design x (FIG. 9) is comprised of an arrangement of two 0.62 mm thick polyurethane thermoplastic elastomer (3') and (3") (PE 399 Huntsman reference) followed by an arrangement of individual layers of unidirectional high density polyethylene fiber having a total thickness of 2.7 mm (Dyneema HB2—DSM Dyneema reference) (6), followed by a 0.62 mm thick polyurethane thermoplastic elastomer (10) (PE 399 Huntsman reference), followed by a 1.0 mm thick polycarbonate layer (2) (G.E. 9034HO—General Electric U.S. reference), followed by a 0.62 mm thick polyurethane thermoplastic elastomer (11) (PE 399 Huntsman reference), followed by a high density unidirectional polyethylene body of fibers (Dyneema HB2—DSM Dyneema reference) having a total thickness of 3.9 mm (5). It is found that at the same level, the orifice comprised between the edge of (5) and the bottom edge of (4) is filled with 0.62 mm thick polyurethane thermoplastic elastomer (8) (PE 399 Huntsman reference). The edge sealant (4) is a 1.24 mm thick polyurethane thermoplastic elastomer film. After this arrangement of materials and towards the BRG protected area, a 1.91 mm thick polyurethane thermoplastic elastomer film (12) (PE 399 Huntsman reference) is found, and following a 2.36 mm thick polycarbonate (7) layer (G.E. 9034HO—General Electric U.S. reference) adhered to another 1.0 mm thick polycarbonate (9) (G.E. 9034HO—General Electric U.S. reference) by a 0.62 mm thick polyurethane thermoplastic elastomer film (PE 399 Huntsman reference). Finally, a 0.15 mm thick polyethylene terephthalate layer (13) is found which acts as hard coating in order to protect the polycarbonate (7) and (9), this layer (13) is bonded to the 1 mm Polycarbonate layer (9) with a 0.62 mm thick polyurethane thermoplastic elastomer film (PE 399 Huntsman reference). The reinforcement (1) used is a 2.0 mm thick steel sheet. Distance 1t is 13 mm and distance 1j is 3 mm; the BRG composition used has three glass layers having the following thicknesses: 5 mm (30'), 5 mm (30"), and 5 mm (30'''); layer 30' is adhered to 30" by two 0.62 mm thick polyurethane thermoplastic elastomer layers (PE 399 Huntsman reference), and layers 30" and 30''' are adhered together by a 0.76 mm thick polyvinyl butyral film.

Figure 9:
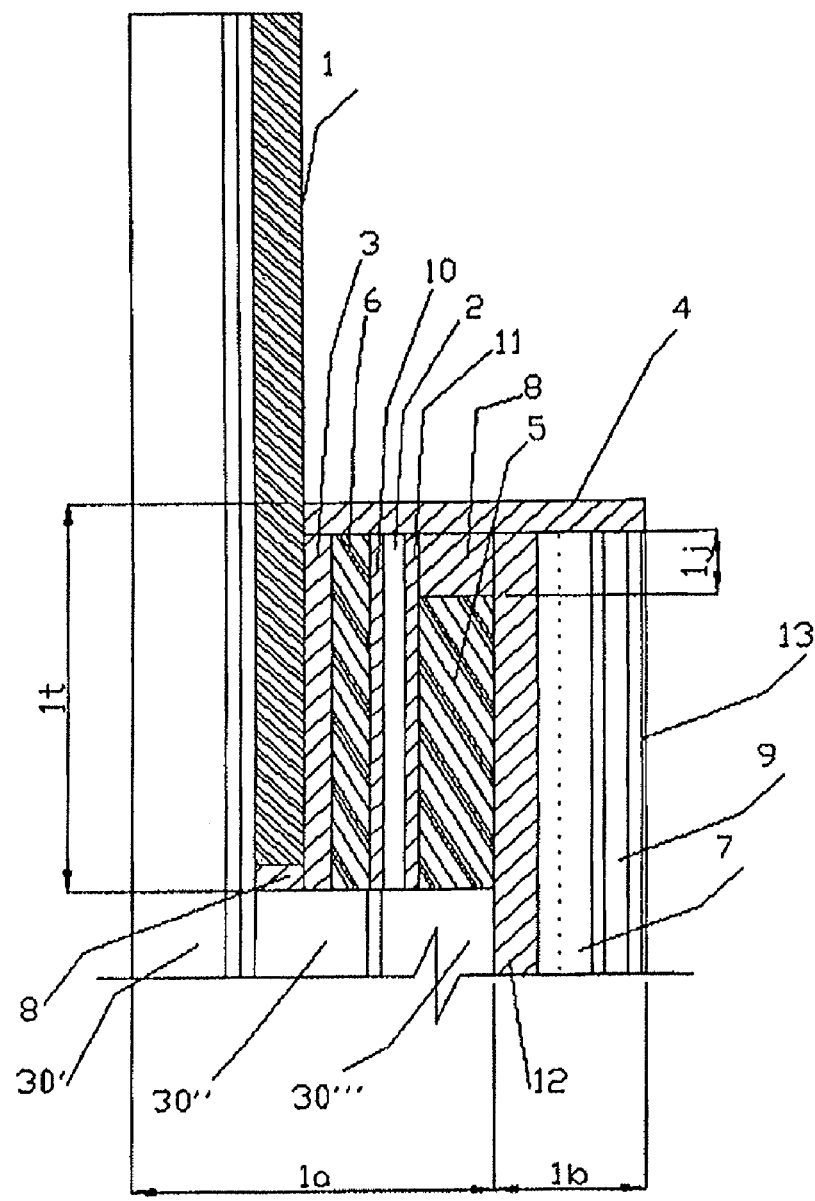
FIG. 9: Demonstrates a cross section of a preferred first embodiment of the invention.

The manufacturing process for design x (FIG. 9) preferably includes a pre-lamination process of elements 3,6,10,2 and 11, which is carried out by subjecting these layers, in the order shown in FIG. 9, to a vacuum of 18-21 mmHg in a sealed plastic bag, which is brought to a temperature between 70° and 110° C. during a period of 10 to 30 minutes while still applying vacuum. The process is finished by cutting the pre-laminated product with a water cutting machine, in the shape required for the specific product being made. This pre-lamination process of elements 3,6,10,2 and 11 facilitates the latter assembly of these elements and of elements 8 and 5 to the BRG body. The assembly of this arrangement of elements 2,3,5,6,8,10 and 11 may be carried out once the assembly of glass, polyvinyl butyral, polyurethane and polycarbonate layers have been done which make up the BRG and the steel (1) reinforcement has been incorporated.

Another preferred embodiment of design x (FIG. 9) is composed of an arrangement of two 0.62 mm thick polyurethane thermoplastic elastomer (3') and (3") (PE 399 Huntsman reference) followed by an arrangement of individual layers of unidirectional high density polyethylene fiber having a total thickness of 1.4 mm (Dyneema HB2—DSM Dyneema reference) (6), followed by two layers of polyurethane thermoplastic elastomer with a total thickness of 1.24 mm (10) (PE 399 Huntsman reference), followed by a 1.0 mm thick polycarbonate layer (2) (G.E. 9034HO—General Electric U.S. reference), followed by a 0.62 mm thick polyurethane thermoplastic elastomer (11) (PE 399 Huntsman reference), followed by a high density unidirectional polyethylene body of fibers (Dyneema HB2—DSM Dyneema reference) having a total thickness of 5.1 mm (5). It is found that at the same level, the orifice comprised between the edge of (5) and the bottom edge of (4) is filled with 0.62 mm thick polyurethane thermoplastic elastomer (8) (PE 399 Huntsman reference). The edge sealant (4) is a 1.86 mm thick polyurethane thermoplastic elastomer film. After this arrangement of materials and towards the BRG protected area, two layers of 0.62 mm thick polyurethane thermoplastic elastomer film (12) (PE 399 Huntsman reference) is found, and following a 3 mm thick polycarbonate (7) layer (G.E. 9034HO—General Electric U.S. reference) adhered to another 1.0 mm thick polycarbonate (9) (G.E. 9034HO—General Electric U.S. reference) by two layers of 0.62 mm thick polyurethane thermoplastic elastomer film (PE 399 Huntsman reference). Finally, a 0.15 mm thick polyethylene terephthalate layer (13) is found which acts as hard coating in order to protect the polycarbonate (7) and (9), this layer (13) is bonded to the 1 mm Polycarbonate layer (9) with a 0.62 mm thick polyurethane thermoplastic elastomer film (PE 399 Huntsman reference). The reinforcement (1) used is a 2.0 mm thick steel sheet. Distance 1t is 21 mm and distance 1j is 3 mm; the BRG composition used has three glass layers having the following nominal thicknesses: 5 mm (30'), 6 mm (30"), and 6 mm (30'''); layer 30' is adhered to 30" by two 0.62 mm thick polyurethane thermoplastic elastomer layers (PE 399 Huntsman reference), and layers 30" and 30''' are adhered together by a 0.62 mm thick polyurethane thermoplastic elastomer layer (PE 399 Huntsman reference). For this preferred embodiment is also performed both, the pre-lamination process of elements 3,6,10,2 and 11 and the assembly of elements 2,3,5,6,8,10 and 11 already described.

The preferred embodiment for design ix (FIG. 10) is comprised of an arrangement of two 0.62 mm thick polyurethane thermoplastic elastomer layers (3') and (3") (PE 399 Huntsman reference) followed by an arrangement of individual layers of unidirectional high density polyethylene fiber having a total thickness of 1.8 mm (Dyneema HB2—DSM Dyneema reference) (6), followed by a 0.62 mm thick polyurethane thermoplastic elastomer (10) (PE 399 Huntsman reference), followed by a 1.0 mm thick polycarbonate layer (2) (G.E. 9034HO—General Electric U.S. reference), followed by a 0.62 mm thick polyurethane thermoplastic elastomer (11) (PE 399 Huntsman reference), followed by a high density unidirectional polyethylene body of fibers (Dyneema HB2—DSM Dyneema reference) having a total thickness of 3.9 mm (5). It is found that at the same level, the orifice comprised between the edge of (5) and the bottom edge of (4) is filled with 0.62 mm thick polyurethane thermoplastic elastomer (8) (PE 399 Huntsman reference). The edge sealant (4) is a 1.24 mm thick polyurethane thermoplastic elastomer film. After this arrangement of materials and towards the BRG protected area, a 1.91 mm thick polyurethane thermoplastic elastomer film (12) (PE 399 Huntsman reference) is found, and following a 2.36 mm thick polycarbonate (7) layer (G.E. 9034HO—General Electric U.S. reference) adhered to another 1.0 mm thick polycarbonate (9) (G.E. 9034HO—General Electric U.S. reference) by a 0.62 mm thick polyurethane thermoplastic elastomer film (PE 399 Huntsman reference). Finally, a 0.15 mm thick polyethylene terephthalate layer (13) is found which acts as hard coating in order to protect the polycarbonate (7) and (9), this layer (13) is bonded to the 1 mm Polycarbonate layer (9) with a 0.62 mm thick polyurethane thermoplastic elastomer film (PE 399 Huntsman reference). The reinforcement (1) used is a 2.0 mm thick steel sheet. Distance $1t$ is 13 mm and distance $1j$ is 3 mm and distance $1h$ is 8 mm. The BRG composition used has three glass layers having the following thicknesses: 4 mm (30'), 6 mm (30"), and 4 mm (30'''); layer 30' is adhered to 30" by two 0.62 mm thick polyurethane thermoplastic elastomer layers (PE 399 Huntsman reference), and layers 30" and 30''' are adhered together by a 0.76 mm thick polyvinyl butyral film. The glass layer 30''' is smaller than the 30" layer a distance of $1h$, element (5) is housed in the space created by this size difference. In reference to the preferred embodiment ix manufacturing process, novelty is also demonstrated by carrying out a pre-laminate process of elements 3,6,10,2 and 11, already described for the preferred embodiment of FIG. 9. The assembly of this arrangement of elements 2,3,5,6,8,10 and 11 may be carried out once the assembly of glass, polyvinyl butyral, polyurethane and polycarbonate layers have been done which make up the BRG and the steel (1) reinforcement has been incorporated.

Figure 10:
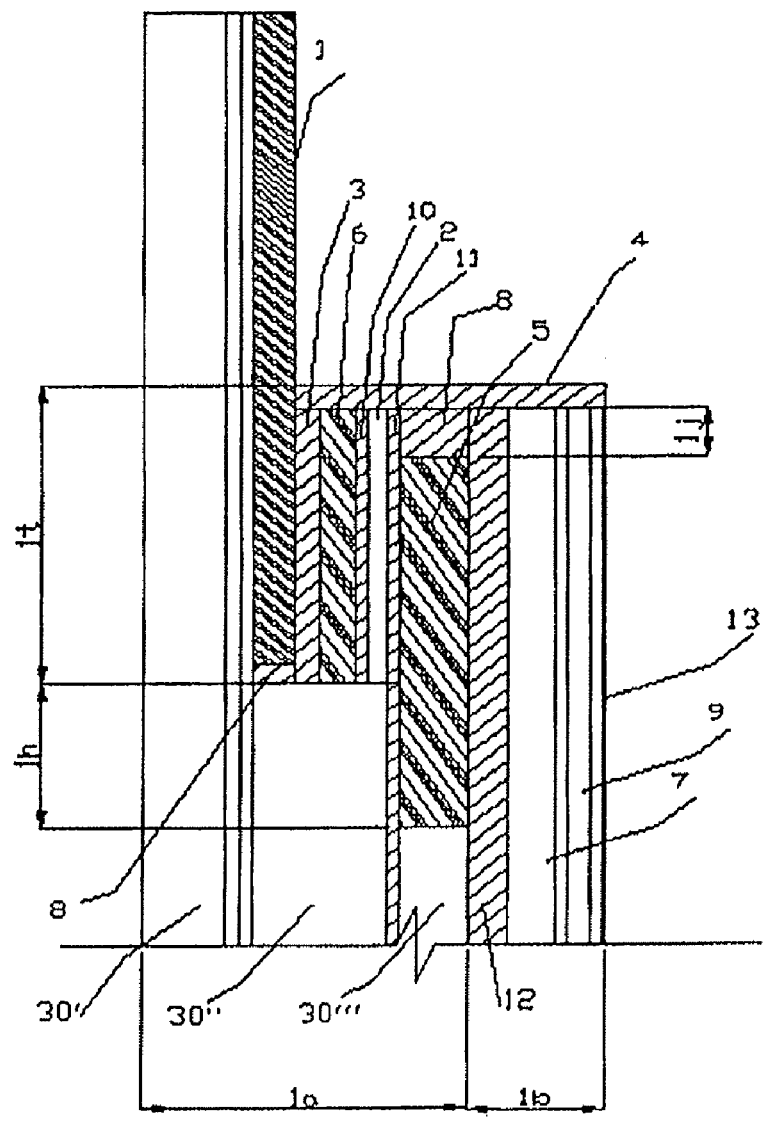
FIG. 10: Demonstrates a cross section of a preferred second embodiment of the invention.

The other preferred embodiments xi and xii (FIGS. 8A-L) are based on the same description of embodiments ix and x in FIGS. 9 and 10, except that the size of the first glass 30' and of the steel reinforcement (1) is delimited by the bottom edge of the edge sealant (4), i.e., both surfaces of the transparent armored composition, given by 30' and the polycarbonate have about the same size. The $1c'$ area (FIG. 1) is zero in these embodiments.

The aforementioned constitutes a complete and detailed disclosure of different embodiments to practice the inventive concept herein claimed. Any skilled person in the art will understand that variations may be carried out without departing from the scope and spirit of the invention. The scope of the invention is defined by the following claims that shall be interpreted in accordance with what was disclosed herein.

The invention claimed is:

1. An armored glass composition comprising:
  a first layered set comprised of glass and adhesive layers, said first set having an exterior side facing away from a protected space;
  a second layered set comprised of energy absorbing and adhesive layers, said second set having an interior side facing towards the protected space and an exterior side adhered to at least part of the interior side of the first layered set;
  a perimeter reinforcement having an exterior side adhered to a portion of the interior side adjacent to the perimeter of the first set and an edge adhered to at least a part of the edges of one or more of the glass layers of the first set;
  characterized in that the armored glass composition further comprises:
  a third layered set of different materials comprised of energy absorbing and adhesive layers, said third set having an exterior side adhered to part of the interior side of the perimeter reinforcement, an interior side adhered to part of the exterior side of second set, and a first edge adhered at least a part of the edges of one or more of the layers of the first set; and
  a sealant layer having an exterior edge adhered to part of the interior side of the perimeter reinforcement and a side adhered to at least a part of the edges of one or more of the layers of the third set and at least a part of the edge of the second set.

2. The armored glass composition of claim 1, wherein the height of one or more layers of the third layered set, measured from the external face of the exterior horizontal layer to the internal edge of said arrangement's layer, ranges between 8 mm to 25 mm.

3. The armored glass composition of claim 1, wherein one or more of the layers the third layered set penetrates the first set a certain distance such that one or more of the layers of the first set has a reduced perimeter compared to other layers in the first set.

4. The armored glass composition of claim 1, wherein the edge of one or more of the layers of the third layered set is separated from the exterior horizontal layer by a spaced filled with adhesive.

5. The armored glass composition of claim 3, wherein the penetration distance ranges from 3 mm to 25 mm.

6. The armored glass composition of claim 4, wherein the distance of the adhesive filled space ranges from 2 mm to 10 mm.

7. The armored glass composition of claim 1, wherein at least one of the layers in the third layered set consists of polycarbonate.

8. The armored glass composition of claim 1, wherein at least one of the layers in the third layered set consists of high toughness unidirectional polyethylene.

9. The armored glass composition of claim 1, wherein the adhesive used is polyurethane thermoplastic elastomer (TPU).

10. The armored glass composition of claim 1, wherein one or more of the third layered set consists of a plurality of individual sheets.

11. The armored glass composition of claim 1, wherein the third set comprises:
  i) an arrangement of layers of material adhered together, wherein:
    in an outside inside order, the first layer is a high toughness unidirectional polyethylene adhered on its external face to the perimeter reinforcement of the first set;
    the second layer is a polycarbonate;
    the third layer is a high toughness unidirectional polyethylene,
  wherein:
    the external edge of said layer is separated from the exterior horizontal layer by a TPU filled space; and,
    the external faces of this layer and TPU fill are adhered to the external face of the internal layer of the second set; and,
  ii) a TPU exterior horizontal layer adhered both to the external edge of the layers of said arrangement—with the exception of the edge of the layer separated by the TPU filled space, and the edge of the second set of the armored glass composition.

12. The armored glass composition of claim 11, wherein the arrangement of layers of materials adhered together uses TPU as adhesive.

13. The armored glass composition of claim 11, wherein the height of the layers of said arrangement, measured from the external face of the exterior horizontal layer to the internal edge of said arrangement's layer, ranges between 8 mm to 25 mm.

14. The armored glass composition of claim 11, wherein the first layer has a thickness between 0.2 and 15 mm.

15. The armored glass composition of claim 11, wherein the second layer has a thickness between 0.5 and 6 mm.

16. The armored glass composition of claim 11, wherein the third layer has a thickness between 0.2 and 15 mm.

17. The armored glass composition of claim 11, wherein the separation between the external edge of the third layer and the exterior horizontal layer is between 2 and 10 mm.

18. The armored glass composition of claim 11, wherein the first and third layer are comprised of a plurality of individual sheets of high toughness unidirectional polyethylene.

19. The armored glass composition of claim 1, wherein the third set comprises:

i) an arrangement of layers of material adhered together, wherein:
  in an outside inside order, the first layer is a high toughness unidirectional polyethylene adhered on its external face to the perimeter reinforcement of the first set;
  the second layer is a polycarbonate;
  the third layer is a high toughness unidirectional polyethylene,
  wherein:
  the external edge of said layer is separated from the exterior horizontal layer by a TPU filled space;
  the internal edge of said layer penetrates the first set a certain distance such that one or more of layers of the first set has a reduced perimeter compared to other layers in the first set; and
  the external faces of this layer and TPU fill are adhered to the external face of the internal layer of the second set; and ii) a TPU exterior horizontal layer adhered both to the external edge of the layers of said arrangement—with the exception of the edge of the layer separated by the TPU filled space, and the edge of the second set of the armored glass composition.

20. The armored glass composition of claim 19, wherein the arrangement of layers of materials adhered together uses TPU as adhesive.

21. The armored glass composition of claim 19, wherein the height of the first and second layers of said arrangement, measured from the external face of the exterior horizontal layer to the internal edge of said arrangement's layer, ranges between 8 mm to 25 mm.

22. The armored glass composition of claim 19, wherein the height of the third layer of the third layered set, measured from the external face of the exterior horizontal layer to the internal edge of said layer of said arrangement, is between 10 mm and 50 mm.

23. The armored glass composition of claim 19, wherein the penetration distance of the third set ranges between 2 and 25 mm.

24. The armored glass composition of claim 19, wherein the first layer has a thickness between 0.2 and 15 mm.

25. The armored glass composition of claim 19, wherein the second layer has a thickness between 0.5 and 6 mm.

26. The armored glass composition of claim 19, wherein the third layer has a thickness between 0.2 and 15 mm.

27. The armored glass composition of claim 19, wherein the separation between the top edge of the third layer and the exterior horizontal layer is between 2 and 10 mm.

28. The armored glass composition of claim 19, wherein the first layer is comprised of a plurality of individual sheets of high toughness unidirectional polyethylene.

* * * * *

US008088472C1

(12) EX PARTE REEXAMINATION CERTIFICATE (9622nd)

United States Patent
Astete et al.

(10) Number: US 8,088,472 C1
(45) Certificate Issued: Apr. 30, 2013

(54) ARMORED GLASS COMPOSITION WITH PERIMETER REINFORCEMENT

(75) Inventors: Arturo Mannheim Astete, Bogota (CO); Vladimir Bocanegra Parra, Bogata (CO)

(73) Assignee: AGP America S.A., Panama (PA)

Reexamination Request:
No. 90/012,531, Sep. 13, 2012

Reexamination Certificate for:
Patent No.: 8,088,472
Issued: Jan. 3, 2012
Appl. No.: 11/663,949
Filed: Jun. 28, 2007

(21) Appl. No.: 90/012,531

(22) PCT Filed: Sep. 28, 2005

(86) PCT No.: PCT/IB2005/003094
§ 371 (c)(1), (2), (4) Date: Jun. 28, 2007

(87) PCT Pub. No.: WO2006/035312
PCT Pub. Date: Apr. 6, 2006

(30) Foreign Application Priority Data

Sep. 28, 2004 (CO) .................................. 04096136

(51) Int. Cl.
*B32B 7/02* (2006.01)

(52) U.S. Cl.
USPC ............ 428/212; 428/215; 428/426; 428/433

(58) Field of Classification Search
None
See application file for complete search history.

(56) References Cited

To view the complete listing of prior art documents cited during the proceeding for Reexamination Control Number 90/012,531, please refer to the USPTO's public Patent Application Information Retrieval (PAIR) system under the Display References tab.

*Primary Examiner* — Timothy J Kugel

(57) ABSTRACT

The invention relates to a special array of materials located on the periphery of a glass armored composition (BRG), with the purpose of having a controlled deformation zone being able to absorb residual energy of impacts made on the edge of the armored piece, therefore providing an effective retention of the projectile and of the glass fragments generated by the impact. The invention provides superior ballistic protection for BRGs destined for automobile applications, for fixed and mobile pieces.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *